(12) United States Patent
Hata (10) Patent No.: US 8,771,447 B2
(45) Date of Patent: Jul. 8, 2014

(54) METHOD OF MANUFACTURING PNEUMATIC TIRE

(75) Inventor: Hiroshi Hata, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 912 days.

(21) Appl. No.: 12/278,093

(22) PCT Filed: Feb. 26, 2007

(86) PCT No.: PCT/JP2007/053478
§ 371 (c)(1),
(2), (4) Date: Aug. 1, 2008

(87) PCT Pub. No.: WO2007/105470
PCT Pub. Date: Sep. 20, 2007

(65) Prior Publication Data
US 2009/0032176 A1 Feb. 5, 2009

(30) Foreign Application Priority Data

Feb. 27, 2006 (JP) ................... 2006-050656

(51) Int. Cl.
*B29D 30/30* (2006.01)
*B60C 1/00* (2006.01)
*B29D 30/20* (2006.01)
*B29D 30/06* (2006.01)
*B60C 5/14* (2006.01)

(52) U.S. Cl.
CPC ........... *B60C 5/14* (2013.01); *B60C 1/0008* (2013.04); *B29D 30/20* (2013.01); *B29D 30/0681* (2013.01); *B29D 30/3007* (2013.01); *B29D 2030/0682* (2013.01)
USPC ........................................ 156/123

(58) Field of Classification Search
USPC ........................................ 156/123
See application file for complete search history.

(56) References Cited

U.S. PATENT DOCUMENTS

| 4,722,132 A * | 2/1988 | Ciolkevich .............. 29/450 |
| 5,938,869 A * | 8/1999 | Kaido et al. ............ 152/510 |
| 2009/0205770 A1* | 8/2009 | Matsuda ................. 156/123 |

FOREIGN PATENT DOCUMENTS

| JP | A 8-258506 | 10/1996 |
| JP | A 10-35216 | 2/1998 |
| JP | A 2003-145643 | 5/2003 |
| JP | 2005238759 A * | 9/2005 |
| JP | A 2005-238759 | 9/2005 |
| JP | A 2006-224853 | 8/2006 |
| WO | WO 2006/095680 A1 | 9/2006 |

* cited by examiner

*Primary Examiner* — Philip Tucker
*Assistant Examiner* — Vicki Wu
(74) *Attorney, Agent, or Firm* — Greer Burns & Crain, Ltd.

(57) ABSTRACT

Provided is a method of manufacturing a pneumatic tire, which causes no blister to take place during vulcanization molding even in a case where a cylindrical thermoplastic resin film is used as an air-permeation preventing layer while a rubber sheet material laminated onto the thermoplastic resin film has a thickness of 0.5 mm or more. The method includes the steps of: winding an unvulcanized rubber sheet material with a thickness of 0.5 mm or more around a cylindrical thermoplastic resin film which is placed around a making drum; and splicing one end portion and the other end portion of the rubber sheet material together so that the spliced part is step-shape. The method is characterized in that one end portion of the rubber sheet material is spliced onto the other end portion thereof with an auxiliary rubber sheet interposed between a step part of the spliced part of the rubber sheet material and the thermoplastic resin film, the auxiliary rubber sheet being thinner than the thermoplastic resin film.

7 Claims, 7 Drawing Sheets

METHOD OF MANUFACTURING PNEUMATIC TIRE

This application is a U.S. National Phase under 35 U.S.C. §371, of International Application No. PCT/JP2007/053478, filed Feb. 26, 2007.

TECHNICAL FIELD

The present invention relates to a method of manufacturing a pneumatic tire, and specifically to a method of manufacturing a pneumatic tire, which method prevents blisters which would otherwise be easy to occur in the course of vulcanization molding with a cylindrical thermoplastic resin film being used as an air-permeation preventing layer of the pneumatic tire.

BACKGROUND ART

A tubeless pneumatic tire is lined with an air-permeation preventing layer in an integrated manner. A butyl rubber which exhibits excellent air non-permeability is used as a material for the air-permeation preventing layer. Because, however, the butyl rubber has a large specific gravity, the butyl rubber places obstacles in the way of manufacturing lighter-weight pneumatic tires, which is an increasingly strong demand from the market in these years. As measures to meet the demand, Patent Document 1 has proposed use of a thermoplastic resin film, instead of the butyl rubber, as an air-permeation preventing layer, with a smaller specific gravity of the thermoplastic resin film taken into consideration, thereby paving the way for manufacturing pneumatic tires with a far lighter weight.

Figure 2:
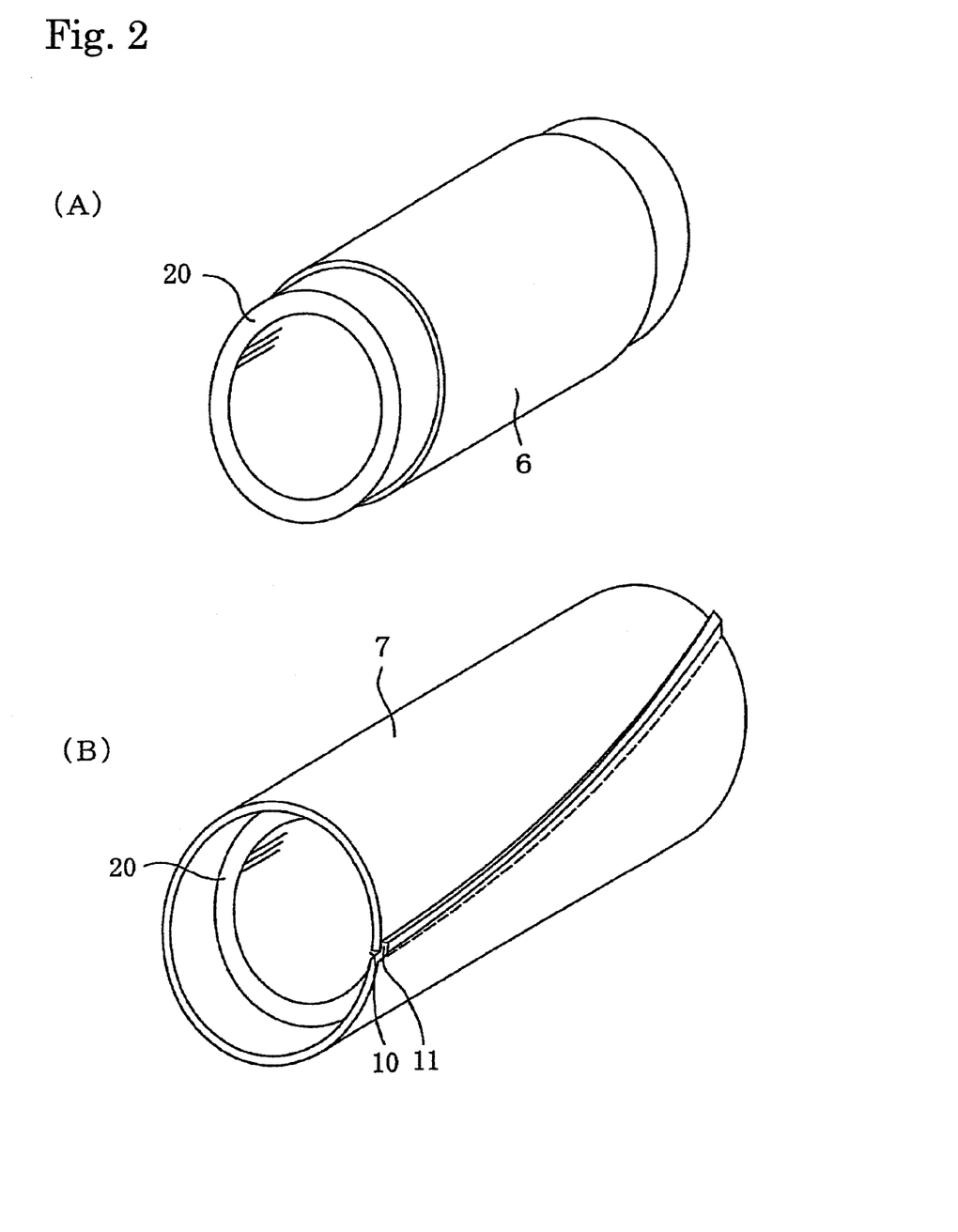
FIG. 2 is an explanatory perspective view showing an example of a process for molding a green tire with a drum in a method of manufacturing a tire according to an embodiment of the present invention.
Figure 7:
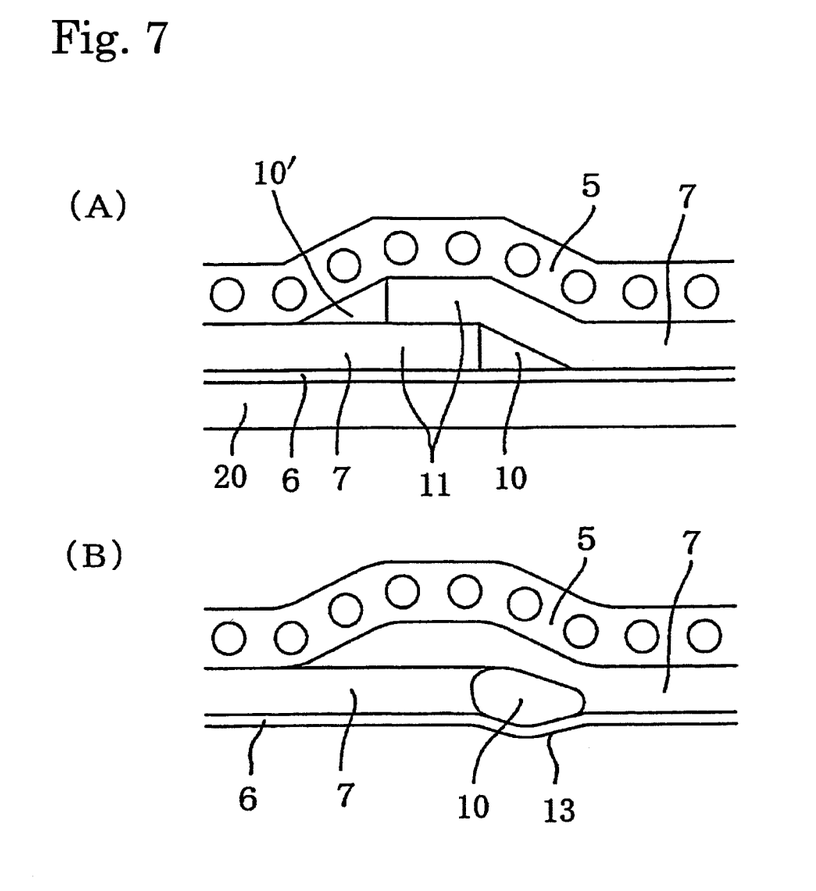
FIG. 7 is a cross-sectional view of a spliced part formed in a drum molding process in a conventional type of method of manufacturing a pneumatic tire using a thermoplastic resin film, the view being taken in an axial direction of the drum.

However, the use of the thermoplastic resin film as the air-permeation preventing layer comes with a problem that blisters are easy to occur inside a tire during a vulcanization molding step. As shown in FIG. 2, a pre-vulcanized green tire is formed by placing a cylindrical thermoplastic resin film 6 around a making drum 20, and subsequently laminating a carcass material onto the thermoplastic resin film 6 with an unvulcanized rubber sheet material 7 such as a tie rubber being interposed in between. The rubber sheet material 7 includes a spliced part 11, which is step-shaped, and which is formed when one end portion of the rubber sheet material 7 is spliced onto the other end portion thereof after the rubber sheet material 7 is wound around the thermoplastic resin film 6. An air pocket 10 which has a triangular cross-section is formed between the step of this spliced part 11 and the thermoplastic resin film 6, as shown in FIG. 7(A). When the green tire is formed by further laminating the other tire members such as a belt layer and a tread rubber onto the resultant rubber sheet material 7 under the presence of such air pocket 10, and then is molded through vulcanization, the air contained in the air pocket 10 increases in volume. Then, a part of the surface of the thermoplastic resin film 6 accordingly rises, as shown in FIG. 7(B). In other words, a blister 13 is formed. The blister 13 not only damages an aesthetic outer appearance of the inner surface of the tire, but also often poses a cause of breakage of the thermoplastic resin film while in use.

Because, as described above, the blister is caused by the volume increase of the air pocket during vulcanization molding, the blister conspicuously appears when the air pocket grows large. As long as the air pocket is small, no blister takes place.

Specifically, the blister is easier to take place as the step of the spliced part becomes larger when the rubber sheet material 7 is 0.5 mm or more in thickness.

On the other hand, rubber materials including the butyl rubber cause no blister to take place, because a property of the rubber materials is air absorption. Even when, as described above, an air pocket is formed, by using one of the rubber materials as the air-permeation preventing layer, the air in the air pocket is eventually absorbed in the rubber material during vulcanization. In sum, the blister is a problem peculiar to a case when the thermoplastic resin film is used as the air-permeation preventing layer.

Patent Document 1: Japanese patent application Kokai publication No. Hei. 8-258506

DISCLOSURE OF THE INVENTION

Problem to be Solved by the Invention

An object of the present invention is to provide a method of manufacturing a pneumatic tire, which method causes no blister to take place during vulcanization molding even in a case where a cylindrical thermoplastic resin film is used as an air-permeation preventing layer while a rubber sheet material laminated onto the thermoplastic resin film has a thickness of 0.5 mm or more.

Means for Solving the Problem

A method of manufacturing a pneumatic tire according to the present invention for the purpose of achieving the foregoing object includes the steps of: winding an unvalcanized rubber sheet material with a thickness of 0.5 mm or more around a cylindrical thermoplastic resin film which is placed around a making drum; and splicing one end portion onto the other end portion of the rubber sheet material while overlapping both end portions thereof so that the spliced part is step-shaped, the method being characterized in that one end portion of the rubber sheet material is spliced onto the other end portion thereof with an auxiliary rubber sheet interposed between the step part of the spliced part of the rubber sheet material and the thermoplastic resin film, the auxiliary rubber sheet being thinner than the rubber sheet material.

Another method of manufacturing a pneumatic tire according to the present invention for the purpose of achieving the foregoing object includes the steps of: winding an unvalcanized rubber sheet material with a thickness of 0.5 mm or more around a cylindrical thermoplastic resin film which is placed around a making drum; and splicing one end portion onto the other end portion of the rubber sheet material while overlapping both end portions thereof so that the spliced part is step-shaped, the method being characterized in that the two end portions of the rubber sheet material are spliced together after the end surface of at least one end portion brought into contact with the thermoplastic resin film is formed into an inclined surface, and in that an average inclination angle $\theta$ of the inclined surface to the thickness direction of the rubber sheet material is determined in a range of 5° to 89° and in a range satisfying $$\theta(°) \geq 50t - 25$$

where t denotes the thickness (mm) of the rubber sheet material.

Effect of the Invention

The former invention causes the auxiliary rubber sheet, which is thinner than the rubber sheet material, to be interposed between the step part of the rubber sheet material and the thermoplastic resin film. This interposition puts the air pocket formed in the step part into condition where the air pocket is encompassed with the rubber materials. This encompassment increases the amount of air which is absorbed into the rubber materials during vulcanization. This makes it possible to prevent blisters from taking place even though the rubber sheet material has a thickness of 0.5 mm and more.

In the case of the latter invention, the end surface of a first end portion brought into contact with the thermoplastic resin film is formed into an inclined surface. In addition, the inclination angle of the inclined surface is designed to have the specific relationship with the thickness of the rubber sheet material. These schemes reduces the volume of the air pocket formed between the inclined surfaced and a second end portion overlapping the first end portion as much as possible. This makes it possible to prevent blisters from taking place even though the rubber sheet material has a thickness of 0.5 mm and more.

EXPLANATION OF REFERENCE NUMERALS

| | |
|---|---|
| 6 | thermoplastic resin film |
| 7 | rubber sheet material |
| 8 | rubber strip piece having a wedge-shaped cross-section |
| 10, 10' | air pocket |
| 11 | spliced part |
| 12 | auxiliary rubber sheet |
| 13 | blister |
| 20 | making drum |

BEST MODES FOR CARRYING OUT THE INVENTION

Figure 1:
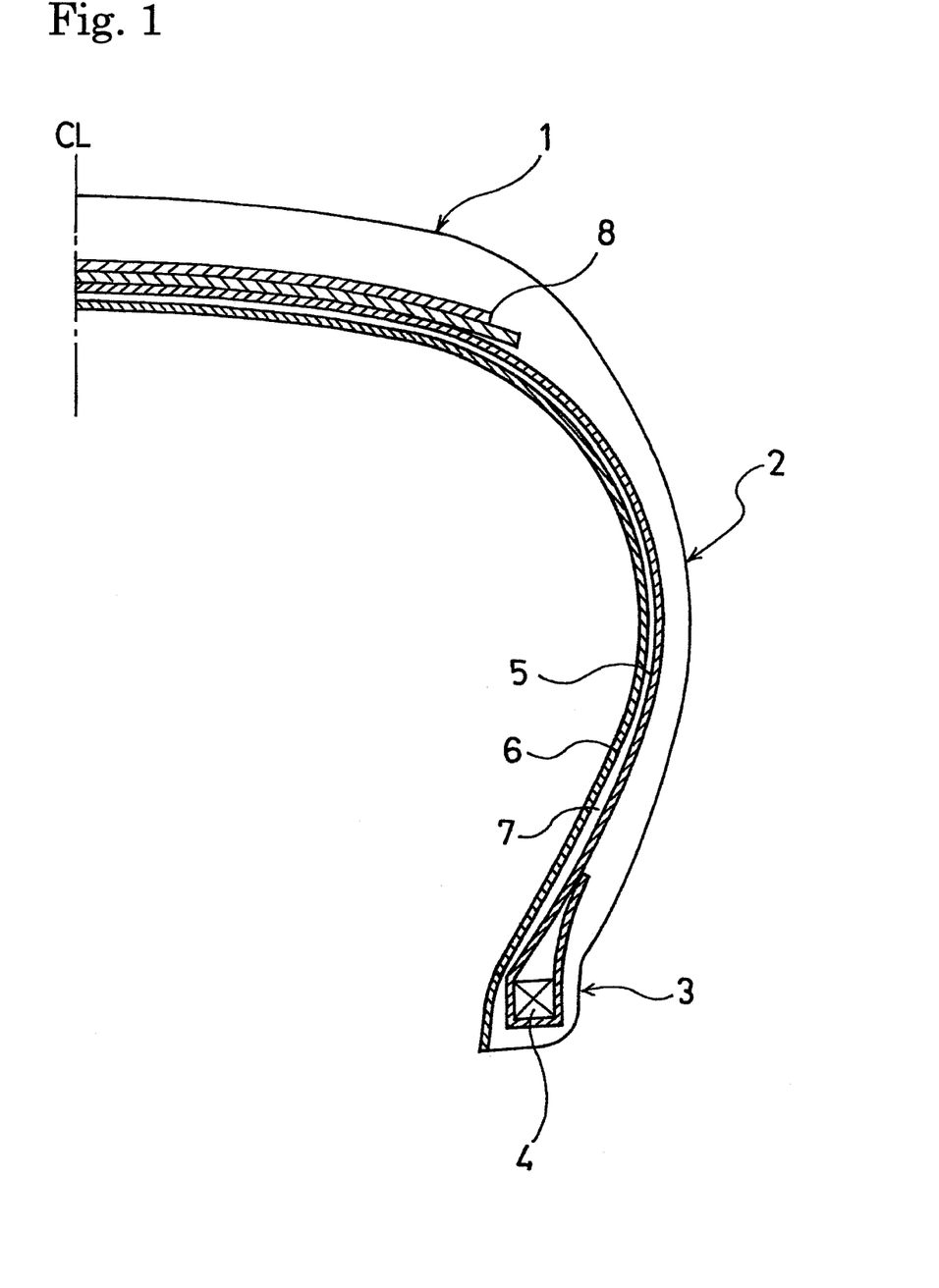
FIG. 1 is a half section of an example of a pneumatic tire manufactured by application of the present invention, the half section being taken in a meridional direction of the tire.

In FIG. 1, reference numeral 1 denotes a tread part; 2, a sidewall part; and 3, a bead part. A carcass layer 5 is laid between the paired right and left bead cores 4 embedded in the respective bead parts 3. The two end portions of the carcass layer 5 are folded back around the bead cores 4 from the inside to the outside of the tire. In the tread part 1, paired upper and lower belt layers 8 are arranged outside the carcass layer 5 so as to make a full circuit around the tire. The tire is lined with a thermoplastic resin film 6 as an air-permeation preventing layer in the innermost part of the tire. As an adhesive layer, a tie rubber sheet material 7 with a thickness of 0.5 mm and more is arranged between the thermoplastic resin film 6 and the carcass layer 5.

In the case of a method of manufacturing the pneumatic tire having the foregoing configuration, when a pre-vulcanized green tire is going to be formed, as shown in FIG. 2, the thermoplastic resin film 6 as the innermost layer and the rubber sheet material 7 (the tie rubber sheet) are laminated one to the other on a making drum 20 in the following manner.

First of all, as shown in FIG. 2(A), the cylindrical thermoplastic resin film 6 is placed around the making drum 20. Subsequently, as shown in FIG. 2(B), the unvulcanized tie rubber sheet material 7 having a thickness of 0.5 mm or more is wound around the thermoplastic resin film 6 so as to be wider than the making drum 20, and to make a full circuit around the tire. Thereafter, one end portion of the rubber sheet material 7 is spliced onto the other end portion while overlapping both end portions thereof. For this reason, a spliced part 11, which is step-shaped, is formed. Subsequently, the carcass layer 5 is wound around this tie rubber sheet material 7 so as to make a full circuit around the tire. Thereafter, the paired right and left bead cores 4 are fitted into the two respective end portions of the cylindrical carcass layer 5. Then, the two end portions of the carcass layer 5 are folded back so that the bead cores 4 are wrapped in the respective end portions. A side rubber is laminated onto the resultant carcass layer 5. With this, the formation of a first green tire is completed. The first green tire is removed from the making drum 20, and is newly mounted on a second making drum. Thereafter, a second green tire is formed on the second making drum by laminating the belt layers 8 and a tread rubber onto the first green tire. Subsequently, the second green tire is placed in a mold, and is vulcanized.

In the case of the conventional type of manufacturing method, as described in a section entitled "BACKGROUND ART", the air pocket 10 is inadvertently formed in the step part of the rubber sheet material 7 when the rubber sheet material 7 is wound onto the thermoplastic resin film 6, as shown in FIG. 7(A). As a result, the air pocket 10 grows in volume in the vulcanization step, and causes the blister as shown in FIG. 7(B).

Unlike the conventional type of manufacturing method, the manufacturing method according to the present invention prevent a blister from being formed by dealing with the air pocket 10 in this spliced part 11 in manners which will be described by use of FIGS. 3 to 5.

Figure 3:
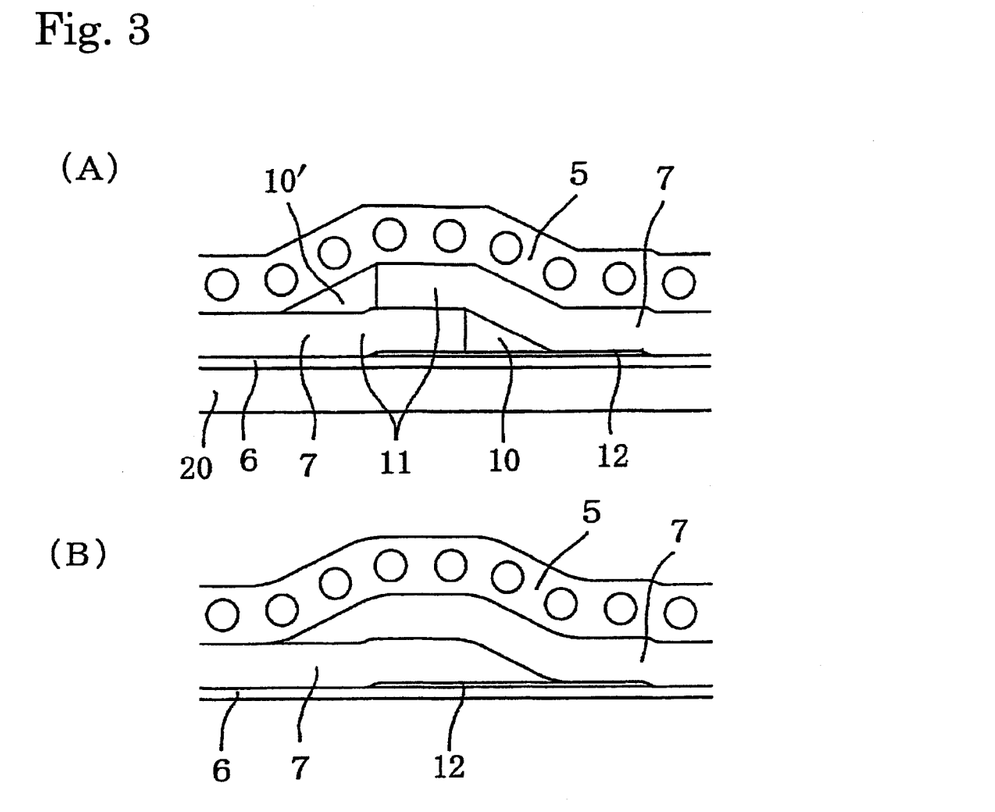
FIG. 3(A) is a partially-magnified cross-sectional view of a spliced part formed in the drum molding process in the method of manufacturing a tire according to the embodiment of the present invention, the view being taken in an axial direction of the drum.
FIG. 3(B) is a partially-magnified cross-sectional view of the spliced part, which has been molded through vulcanization.

A processing method which will be described by use of FIG. 3 is a first invention of the present invention. The cylindrical thermoplastic resin film 6 is placed around the making drum 20. Subsequently, a thin auxiliary rubber sheet 12 is beforehand wound along a location where the spliced part 11 is going to be formed. Thereafter, the unvulcanized rubber sheet material 7 with a thickness of 0.5 mm or more is wound around the thermoplastic resin film 6 so that the spliced part 11 is positioned at the location where the thin auxiliary rubber sheet 12 is wound. Thereby, the green tire is formed so that the thermoplastic resin film 6 is covered with the thin auxiliary rubber sheet 12 in the air pocket 10 inadvertently formed in the step part in the spliced part 11 of the rubber sheet material 7.

As a result, when the green tire thus formed is molded and vulcanized, the air pocket 10 encompassed by the thin auxiliary rubber sheet 12 and the step part in the spliced part of the rubber sheet material 7 disappears as shown in FIG. 3(B), because the air in the air pocket 10 is absorbed in the rubber sheet material 7 and the thin auxiliary rubber sheet 12. No blister accordingly takes place. It should be noted that, although an air pocket 10' is inadvertently formed between the carcass layer 5 and a step on the opposite side of the spliced part 11, the air pocket 10' closer to the carcass layer 5 also disappears because the air contained in the air pocket 10' is absorbed in the rubber sheet material 7 and the coating rubber of the carcass layer 5.

It is desirable that the thin auxiliary rubber sheet 12 used in the manufacturing method according to the present invention should be thin. It is more desirable that the thin auxiliary rubber sheet 12 should be not thicker than the thermoplastic resin film 6. Specifically, it is desirable that the auxiliary rubber sheet 12 should be less than 0.4 mm in thickness. It is more desirable that the auxiliary rubber sheet 12 should be not less than 0.2 mm but less than 0.4 mm in thickness. When the thickness of the thin auxiliary rubber sheet 12 is designed to be in the foregoing range, this design makes it possible for the thin auxiliary rubber sheet 12 to absorb the air contained in the air pocket fully, and accordingly makes it possible to check the step part from growing large.

Figure 4:
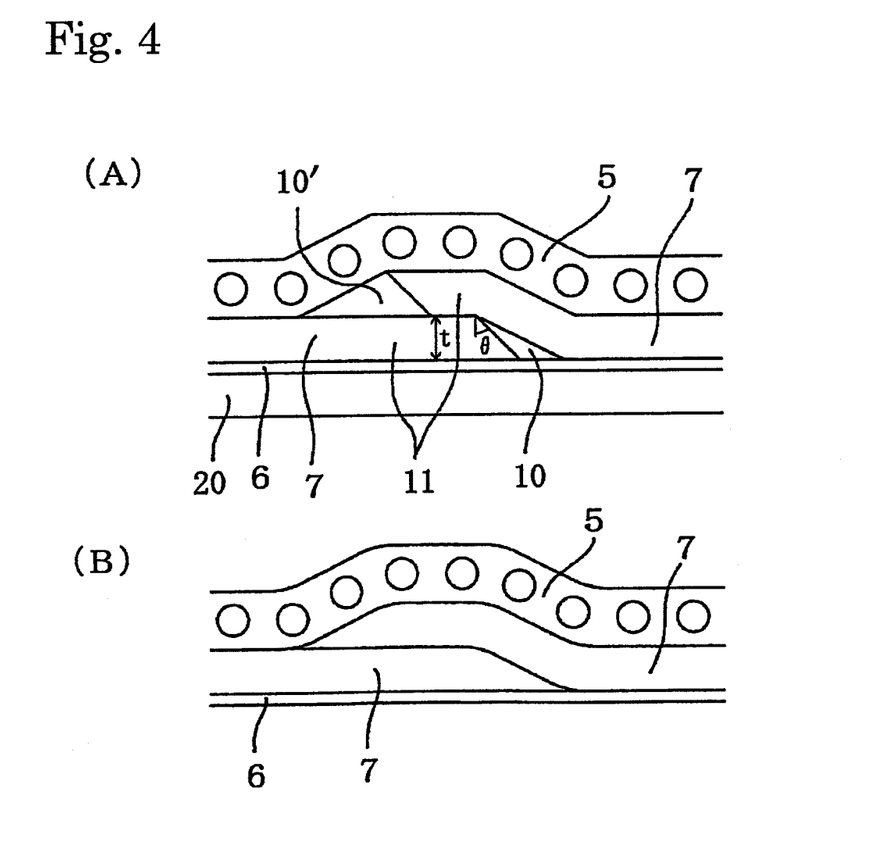
FIG. 4(A) is a partially-magnified cross-sectional view of a spliced part formed in the drum molding process in the method of manufacturing a tire according to another embodiment of the present invention, the view being taken in an axial direction of the drum.
FIG. 4(B) is a partially-magnified cross-sectional view of the spliced part, which has been molded through vulcanization.

FIG. 4 shows an embodiment corresponding to a second invention of the present invention.

As shown in FIG. 4, when a first end portion of the unvulcanized rubber sheet material 7 with a thickness of 0.5 mm and more is going to be spliced onto a second end portion thereof so that the spliced part is step-shaped after the rubber sheet material 7 is wound around the cylindrical thermoplastic resin film 6 placed around the making drum 20, the end surface of the first end portion of the rubber sheet material 7, which end portion is brought into contact with the thermoplastic resin film 6, is beforehand formed into an inclined surface as shown in FIG. 4(A). The second end portion of the rubber sheet material 7 is spliced onto the first end portion thereof so as to cover the inclined surface of the first end portion.

If, out of the two end portions of the rubber sheet material 7, the end surface of at least a first end portion brought into contact with the thermoplastic resin film 6 is formed into the inclined surface, the volume of the air pocket 10 formed in the step part of the rubber sheet material 7 can be minimized as much as possible when a second end portion thereof overlaps the first end portion. As a result, even the rubber materials only in the step part absorbs the air contained in the air pocket fully during the vulcanization molding, and the air pocket 10 accordingly disappears, as shown in FIG. 4(B). Eventually, no blister takes place.

In the case of the second invention, for the purpose of preventing a blister from being formed as described above, it is necessary that the average inclination angle θ of the inclined surface as the end surface of the first end portion of the rubber sheet material to the thickness direction of the rubber sheet material should be determined in a range of 5° to 89°, and should satisfy $$\theta(°) \geq 50t - 25$$

where t denotes the thickness of the rubber sheet material.

In this respect, the average inclination angle θ° means an angle formed between the thickness direction of the rubber sheet material and a plane including a straight line joining the upper and lower ends of the inclined surface, whether or not the inclined surface may be a plane.

When the average inclination angle θ is determined within the ranged thus set up, it is possible to reduce the size of the air pocket down to a volume which enables the air pocket to disappear during vulcanization molding, and to carry out the splicing process more easily.

Figure 6:
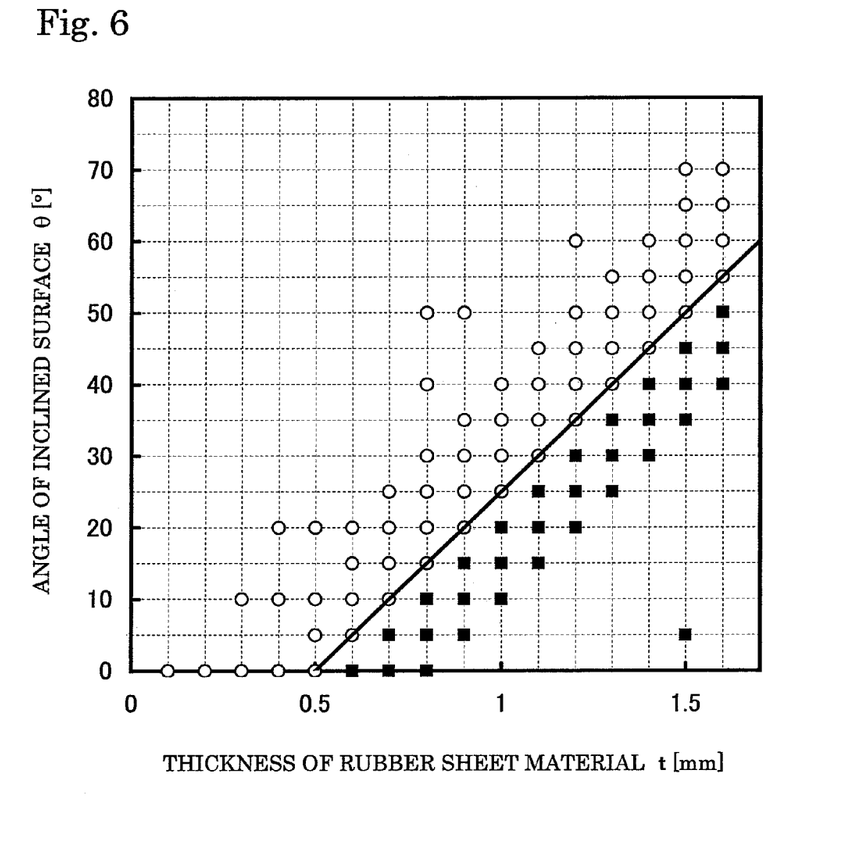
FIG. 6 is a graph showing a relationship between an average inclination angle δ and the thickness t of a rubber sheet material in the embodiment described by use of FIG. 4.

The equation expressing the relationship between the average inclination angle θ and the thickness t of the rubber sheet material is obtained from a graph illustrating the relationship between the average inclination angle θ and the thickness t of the rubber sheet material, which graph is shown in FIG. 6.

FIG. 6 shows a result of an experiment through which it was checked whether or not a blister was formed by changing the average inclination angle θ and the thickness t of the rubber sheet material variously. Each plot marked with a white circle indicates that no blister took place in this experiment, whereas each plot marked with a black square indicates that a blister was formed in this experiment. A line expressed with $$\theta = 50t - 25$$

is given to the boundary between the plots marked with the respective white circles and the plots marked with the respective black squares.

Figure 5:
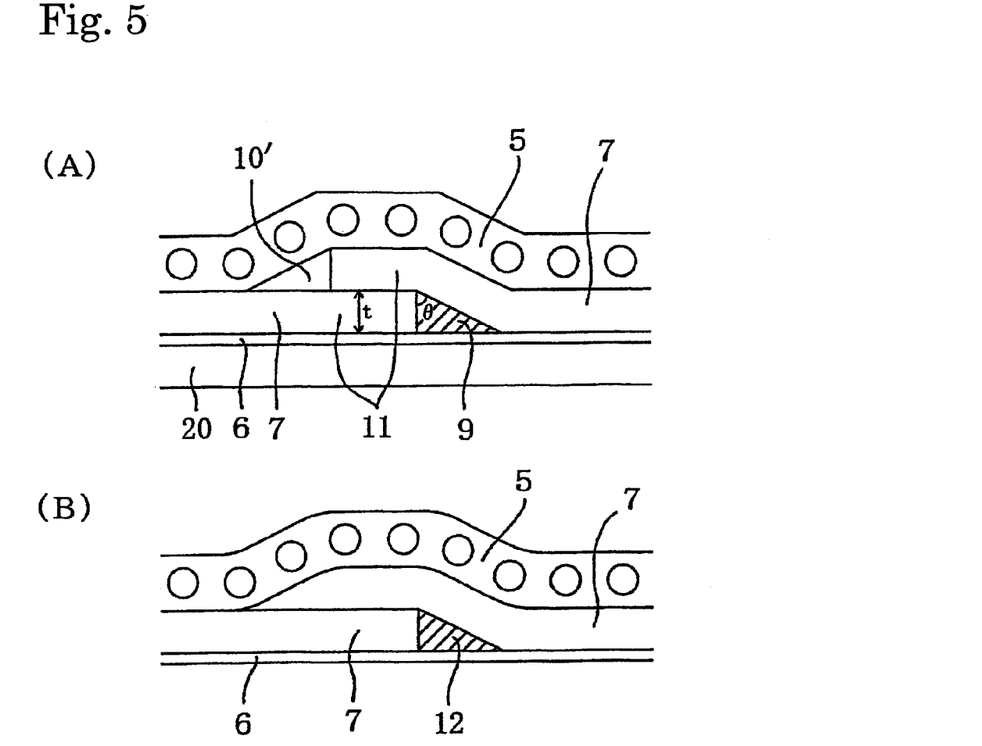
FIG. 5(A) is a partially-magnified cross-sectional view of a spliced part formed in the drum molding process in the method of manufacturing a tire according to yet another embodiment of the present invention, the view being taken in an axial direction of the drum.
FIG. 5(B) is a partially-magnified cross-sectional view of the spliced part, which has been molded through vulcanization.

In the case of the present embodiment, the inclined surface as the end surface of the rubber sheet material 7 may be formed by cutting a part of the end portion thereof, or by attaching a rubber strip piece, which has an inclined surface and is accordingly wedge-shaped cross-sectionally, to the end portion thereof, as shown in FIG. 5.

In the case of an embodiment shown in FIG. 5, out of the end portions of the rubber sheet material 7, at least a first end portion brought into contact with the thermoplastic resin film 6 is caused to have an inclined surface which is formed by attaching a rubber strip piece 9 with the wedge-shaped cross-section to the end surface of the first end portion, as shown in FIG. 5(A). A second end portion of the rubber sheet material 7 is spliced onto the first end portion so as to cover the inclined surface.

This embodiment also makes it possible to minimize the volume of the air pocket inadvertently formed in the step-shaped spliced part of the rubber sheet material, and accordingly to cause no blister to take place in the inner surface of the tire as shown in FIG. 5(B) because the rubber sheet material absorbs the air contained in the air pocket.

In the case of both the first and second manufacturing methods according to the present invention, it is desirable that the spliced part should be depressed with stitcher after the unvulcanized rubber sheet material is wound around the cylindrical thermoplastic resin film which is placed around the making drum. It is desirable that the spliced part should be depressed with stitcher particularly before the two end portions of the carcass layer are folded back around the respective bead cores. The stitching of the spliced part pushes out the air which has been included in the step of the spliced part in the unvulcanized rubber sheet material, and accordingly decreases the air pocket in size. This makes it possible to prevent a blister more effectively.

In the present invention, it is desirable that the cylindrical thermoplastic resin film should be a monolayer or multi-layer cylindrical thermoplastic resin film manufactured by subjecting a thermoplastic resin composition to a general extruding molding, for example, an inflation molding.

No specific restriction is imposed on a resin used to form the cylindrical thermoplastic resin film, as long as the resin is melt-moldable. It is desirable that the resin should be a thermoplastic resins including, for example, a polyamide resin, a polyester resin, a polynitrile resin, a polymethacrylate resin, and a polyvinyl resin, or that the resin should be made of a resin composition essentially containing any one of these thermoplastic resins. It is desirable that the resin composition should be a thermoplastic resin composition which has any one of the thermoplastic resin as its matrix, and which has an arbitrary elastomer component as its domain. It is desirable that such an elastomer should be an olefin elastomer, a styrene elastomer, or the like.

In the case of the present invention, the unvulcanized rubber sheet material means a rubber sheet material which is directly laminated onto the thermoplastic resin film used as the air-permeation preventing layer. For this reason, a tie rubber sheet is used as the unvulcanized rubber sheet material when a tie rubber sheet is interposed between the thermoplastic resin film and the carcass layer. When no tie rubber sheet is used between the thermoplastic resin film and the carcass layer, a carcass material is used as the unvulcanized rubber sheet material.

In the case of the manufacturing method of the present invention, no specific restriction is imposed on a rubber composition constituting the unvulcanized rubber sheet material, as long as the rubber composition is of a type which has been used as a material for tires. Examples of the rubber composition include: diene rubbers such NR, IR, BR and SBR; ethylene-propylene copolymer rubber, a styrene elastomer; a rubber composition obtained by adding compounding agents, such as carbon black, process oil, and a vulcanizing agent, to foregoing rubbers. It should be noted that a rubber composition constituting the rubber strip piece having a wedge-shape cross-sectionally and/or the thin auxiliary rubber sheet can be selected from the same group consisting of rubber compositions each constituting the rubber sheet material 7.

Descriptions will be provided hereinbelow for the present invention by citing examples. However, the citation of examples shall not impose any restriction on the scope of the present invention.

EXAMPLES

Green tires were made in accordance with the following common conditions: 195/65R15 was used as the tire size; the configuration shown in FIG. 1 was used as the tire structure; a cylindrical thermoplastic resin film (0.2 mm in thickness) was used as the air-permeation preventing layer; a tie rubber was used as the rubber sheet material; and three spliced parts were provided thereto by dividing the rubber sheet material into three sections so that a blister may be easy to be formed.

In addition, the green tires were molded through vulcanization in accordance with the following conditions: the temperature of the mold was 173° C.; and the vulcanization time was 12 minutes. For each green tire, it was visually evaluated whether or not a blister was formed by making the method of processing the spliced parts of the rubber sheet material different from one green tire to another.

Conventional Example

A green tire was made by use of a rubber sheet material, an end surface of which was almost at a right angle ($\theta=0°$), and which was 0.7 mm in thickness, followed by vulcanization molding. After the vulcanization molding, blisters were observed in the inner surface of the thermoplastic resin film of the pneumatic tire according to the conventional example.

Example 1

A green tire was made in the same manner as the green tire according to the conventional example was, except that a thin auxiliary rubber sheet with a thickness of 0.3 mm was arranged on the thermoplastic resin film placed on the making drum, and that the rubber sheet material was subsequently arranged on the thin auxiliary rubber sheet so that the steps of the respective spliced parts of the rubber sheet material were positioned on the respective thin auxiliary rubber sheets. Because the pneumatic tire according to example 1 included the thin auxiliary rubber sheets which were interposed between the thermoplastic resin film and the respective steps of the spliced parts of the rubber sheet material, no manufacturing failure including blister was observed in the inner surface of the thermoplastic resin film after the vulcanization molding.

Examples 2 to 5 and Comparative Examples 1 and 2

Each example of the green tire was manufactured with the following changes having been made to the conventional example. The changes made were: the thickness t of the rubber sheet material, and the inclination angle $\theta$ of the inclined surface of the rubber strip piece with the wedge-shaped cross-section or of the inclined surface as the end surface of an end portion of the rubber sheet material. Subsequently, each tire was molded through vulcanization. Table 1 shows the obtained results.

TABLE 1

| | CONVENTIONAL EXAMPLE | EXAMPLE 2 | EXAMPLE 3 | EXAMPLE 4 | EXAMPLE 5 | COMPARATIVE EXAMPLE 1 | COMPARATIVE EXAMPLE 2 |
|---|---|---|---|---|---|---|---|
| RUBBER STRIP PIECE WITH WEDGE-SHAPED CROSS-SECTION | NOT INCLUDED | INCLUDED AT ANGLE OF 60° | NOT INCLUDED | NOT INCLUDED | NOT INCLUDED | NOT INCLUDED | NOT INCLUDED |
| THICKNESS t OF RUBBER SHEET MATERIAL [mm] | 0.7 | 0.7 | 1.0 | 1.5 | 0.8 | 1.5 | 1.5 |
| ANGLE $\theta$ OF INCLINED SURFACE [°] | 0 | 60 | 35 | 70 | 50 | 40 | 5 |
| PRESENCE OR ABSENCE OF BLISTERS | PRESENT | ABSENT | ABSENT | ABSENT | ABSENT | PRESENT | PRESENT |

As shown in Table 1, no manufacturing failure including blisters was observed in the pneumatic tire according to example 2 after the vulcanization molding. That is because the inclined surface was formed by attaching the rubber strip piece (0.7 mm in thickness, the inclined surface at 60°) with the wedge-shaped cross-section to the end surface of the rubber sheet material placed on the thermoplastic resin film.

No manufacturing failure including blisters was observed in the pneumatic tires respectively according to examples 3 to 5 although their rubber sheet materials were thicker than that of the pneumatic tire according to the conventional example. That is because the end surface of the end portion of the rubber sheet material placed on the thermoplastic resin film in each of the pneumatic tires according to examples 3 to 5 was formed into the inclined surface.

On the other hand, blisters were observed in the inner surface of each of the pneumatic tires respectively according to comparative examples 1 and 2. That is because the relationship between the angle $\theta$ of the inclined surface as the end surface of the end portion of the rubber sheet material and the thickness t of the rubber sheet material did not satisfy the predetermined relationship condition.

What is claimed is:

1. A method of manufacturing a pneumatic tire comprising the steps of:
    winding an unvulcanized rubber sheet material with a thickness of 0.5 mm or more around a cylindrical thermoplastic resin film which is placed around a making drum; and
    splicing a first end portion directly onto a second end portion of the rubber sheet material while overlapping the first end portion on the second end portion to form a step part at an end surface of the second end portion, which is in contact with the thermoplastic resin film;
    wherein the first end portion of the rubber sheet material is spliced onto the second end portion with an auxiliary rubber sheet extending across the step part and interposed between the rubber sheet material and the thermoplastic resin film underneath the second end portion and an area of the rubber sheet material near the first end portion, the auxiliary rubber sheet being thinner than the rubber sheet material.

2. The method of manufacturing a pneumatic tire as recited in claim 1, wherein the auxiliary rubber sheet has a thickness of less than 0.4 mm.

3. A method of manufacturing a pneumatic tire including the steps of:
    winding an unvulcanized rubber sheet material with a thickness of 0.5 mm or more around a cylindrical thermoplastic resin film which is placed around a making drum;
    attaching a rubber strip piece having a wedge-shaped cross-section to an end surface on a second end portion of the rubber sheet material, which is in contact with the thermoplastic resin film, to form an inclined surface; and
    splicing a first end portion directly onto the second end portion of the rubber sheet material while overlapping the first end portion on the second end portion to form a spliced-part;
    wherein an average inclination angle $\theta$ of the inclined surface to the thickness direction of the rubber sheet material is determined in a range of 5° to 89° and in a range satisfying $$\theta(°) \geq 50t - 25$$

where t denotes the thickness (mm) of the rubber sheet material.

4. The method of manufacturing a pneumatic tire as recited in claim 1, wherein, after the rubber sheet material is wound around the cylindrical thermoplastic resin film, the spliced part is depressed with stitcher.

5. The method of manufacturing a pneumatic tire as recited in claim 1, wherein the rubber sheet material is any one of a tie rubber sheet and a carcass material.

6. The method of manufacturing a pneumatic tire as recited in claim 3, wherein, after the rubber sheet material is wound around the cylindrical thermoplastic resin film, the spliced part is depressed with stitcher.

7. The method of manufacturing a pneumatic tire as recited in claim 3, wherein the rubber sheet material is any one of a tie rubber sheet and a carcass material.

* * * * *